US008082900B2

(12) United States Patent
Germain et al.

(10) Patent No.: US 8,082,900 B2
(45) Date of Patent: Dec. 27, 2011

(54) METHOD FOR PRODUCING A SUPPORT PLATE FOR VALVE BODIES AND A SUPPORT PLATE

(75) Inventors: Laurent Germain, Bernay (FR); Denis Menin, Labaroche (FR); Richard Komurian, Turckheim (FR)

(73) Assignee: Mark IV Systemes Moteurs (SAS), Levallois-Perret (FR)

( * ) Notice: Subject to any disclaimer, the term of this patent is extended or adjusted under 35 U.S.C. 154(b) by 561 days.

(21) Appl. No.: 12/365,207

(22) Filed: Feb. 4, 2009

(65) Prior Publication Data

US 2009/0194060 A1 Aug. 6, 2009

(30) Foreign Application Priority Data

Feb. 5, 2008 (FR) ..................................... 08 50726

(51) Int. Cl.
*F02D 9/10* (2006.01)
*F16K 1/22* (2006.01)

(52) U.S. Cl. ......................... 123/336; 123/337; 251/305

(58) Field of Classification Search .................. 123/336, 123/337, 399, 403, 184.31, 184.34, 184.47, 123/184.53, 184.61, 306; 251/304, 305, 251/308

See application file for complete search history.

(56) References Cited

U.S. PATENT DOCUMENTS

| | | | | | |
|---|---|---|---|---|---|
| 5,630,386 | A * | 5/1997 | Uchida | .................... | 123/184.34 |
| 5,715,782 | A | 2/1998 | Elder | | |
| 5,787,851 | A * | 8/1998 | Sakurai et al. | ................ | 123/306 |
| 6,055,958 | A * | 5/2000 | Aoyama et al. | ............... | 123/308 |
| 6,662,779 | B2 * | 12/2003 | Kotouge | ........................ | 123/336 |
| 6,895,926 | B1 * | 5/2005 | Moreau et al. | ................ | 123/336 |
| 2002/0152982 | A1 | 10/2002 | Pietrowski | | |
| 2007/0084437 | A1 | 4/2007 | Winkelmuller | | |

FOREIGN PATENT DOCUMENTS

EP 1707780 10/2006

OTHER PUBLICATIONS

Priority Search Report dated Aug. 19, 2008, in priority application.

* cited by examiner

*Primary Examiner* — Willis Wolfe, Jr.
(74) *Attorney, Agent, or Firm* — Young & Thompson

(57) ABSTRACT

A method for producing a support plate (1) for valve bodies includes: i) providing a base armature (22) including an even number of portions of pipes (4, 4'); ii) arranging a valve body (5) on portions (19) of the base armature (22) forming temporary reception zones for a valve body (5); iii) mounting the control axis through bearings (7 and 9) and the transverse groove of each valve body (5); iv) molding onto the control axis a bearing support for each valve body (5) and a mounting insert in the corresponding guide bearing (7); v) mounting each valve body (5) on the corresponding bearing support by sliding on the control axis, and vi) inserting mounting inserts in the corresponding guide bearings (7).

17 Claims, 10 Drawing Sheets

METHOD FOR PRODUCING A SUPPORT PLATE FOR VALVE BODIES AND A SUPPORT PLATE

Figure 1:
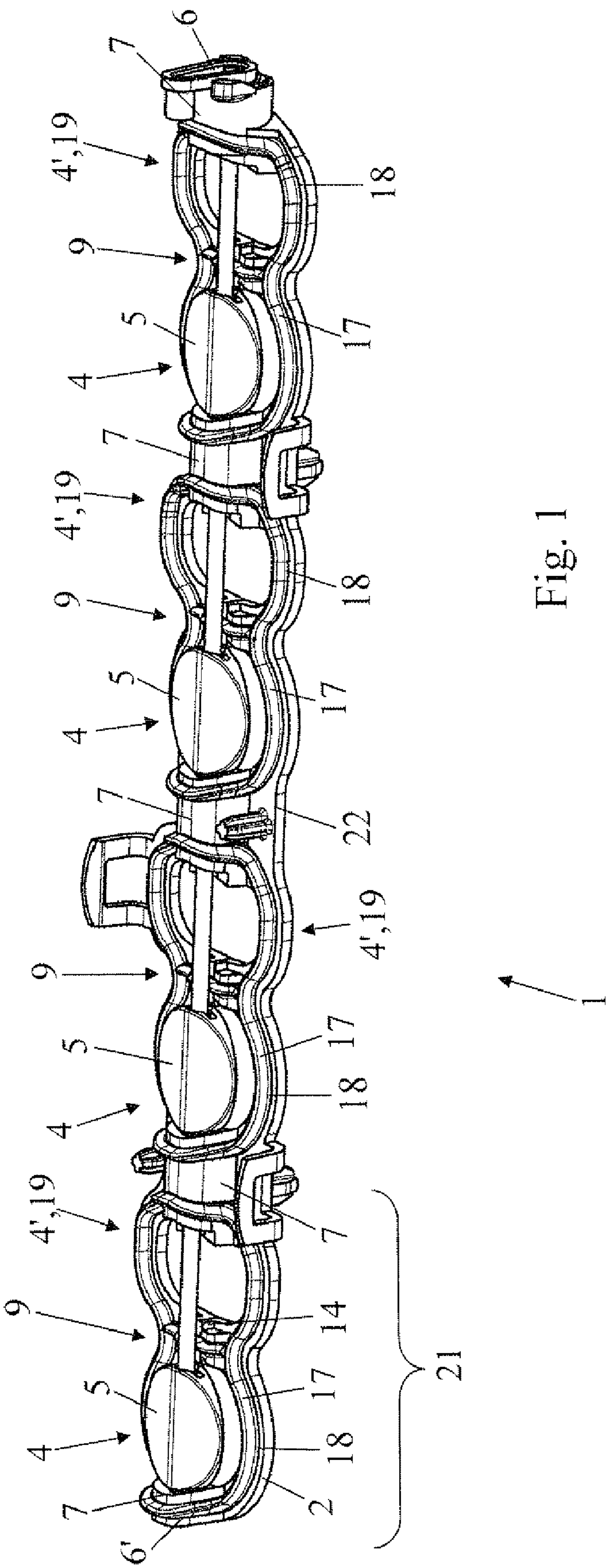

The present invention relates to the field of controlling the flow of fluid, preferably the flow of gas, more precisely the control of a gas flow injected into the cylinders of an internal combustion engine.

The invention relates more particularly to a method for producing a support plate for valve bodies which are designed to be mounted between the cylinder head and the distributor or inlet manifold of a motor vehicle, as well as a support plate which comprises controlled portions of pipe and non-controlled portions of pipe.

This kind of control makes it possible to obtain equivalent fluid speeds at both low and high engine speeds by closing off the portions of pipe controlled by the valves when functioning at low engine speeds and allowing the passage of fluid in the latter at greater engine speeds.

Known support plates have a number of disadvantages. The main problem with known plates is that the bearings in which the valve bodies of the latter are mounted do not maintain their coaxially. As a result there is a risk that the valves may become blocked, and therefore the control of the flow of fluid is no longer performed effectively and there is a loss of energy.

Another problem relates to the absence of a seal between the distributor and the cylinder head.

The present invention proposes to overcome the disadvantages of known devices and provide a support plate in which the alignment of the bearings of the control axis supporting the valve bodies is maintained over time. A plate of this kind may consist of a single complete piece of equipment which can be mounted between the cylinder head of the engine and the distributor or inlet manifold in a simple manner and guarantees a seal between the latter.

Therefore, the subject matter of the invention is method for producing a support pate for valve bodies with a transverse groove for mounting a control axis and with a generally plane configuration, designed to be mounted between the cylinder head of a thermal engine of a motor vehicle and the distributor or inlet manifold, said support plate having an even number of portions of pipes designed to connect fluidly the pipes of the inlet manifold to the inlet openings of the cylinder head, each pair of pipe portions consisting of a portion of controlled pipe, comprising a valve body and forming a controlled flow passage and another portion of adjacent non-controlled pipe which does not comprise a valve body and forms a flow passage which is not controlled, the portions of controlled pipes being aligned relative to one another and positioned spaced apart from one another, the method being characterised in that it consists of i) providing a base armature with an almost plane configuration and extending longitudinally which comprises an even number of pipe portions formed within the thickness of said base armature, in which the portions of controlled pipes are aligned relative to one another and are each adjacent to two bearings arranged diametrically opposite one another for supporting and guiding the control axis of the valve bodies, in which each portion of controlled pipe is connected to a portion of the base armature forming the temporary reception zone of a valve body, said portions being aligned with the portions of controlled pipes, such that two consecutive portions of controlled pipes are separated from one another by a portion of the base armature, and in which each portion comprises a support means for the temporary positioning of a valve body, said base armature having at a first end a bearing adjacent to a portion of the base armature and, at the other end, a bearing adjacent to a portion of controlled pipe, ii) arranging a valve body on the support means on each portion of the base armature, such that the assembly of transverse grooves of the valve bodies are aligned relative to one another between them and with bearings, iii) mounting the control axis in the form of a rod through the bearings and the transverse groove of each valve body until the insertion end of the said rod is located close to the bearing of the second end of the base armature, iv) moulding on each portion of controlled pipe on the control axis, on the one hand, a bearing support for a valve body and, on the other hand, a mounting insert for mounting in a corresponding bearing, v) mounting each valve body on its corresponding bearing support by sliding each valve body on the control axis, from its position at the portion of the base armature towards the adjacent portion of controlled pipe, at which the control axis is provided with a bearing support, and vi) inserting the mounting inserts in the corresponding bearings by sliding the control axis until it abuts with the bearing situated at the second end of the base armature.

It also relates to a support plate of this kind.

Figure 2A:
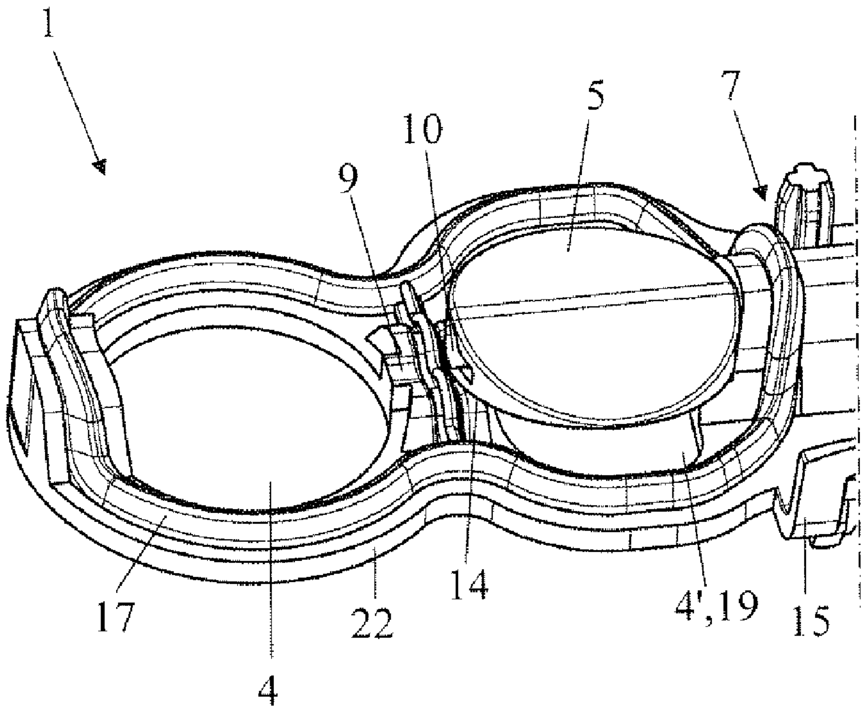
Figure 2B:
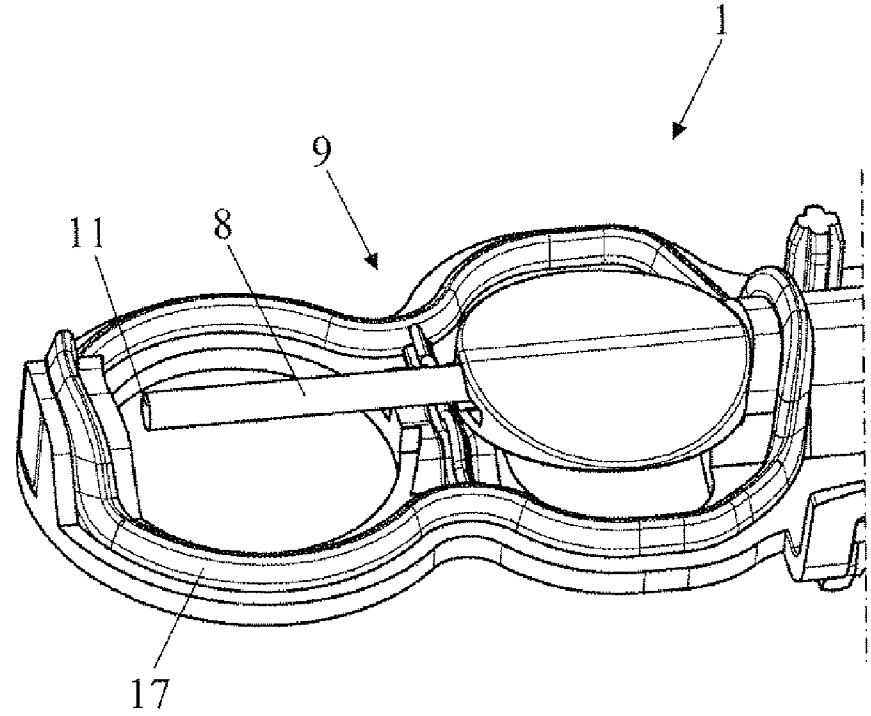
Figure 2C:
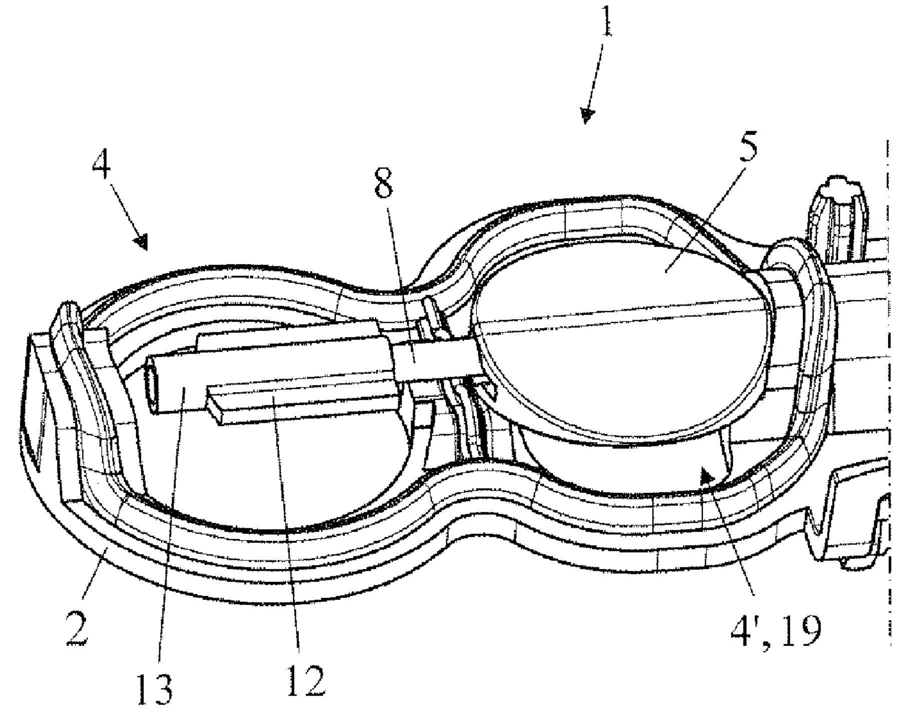
Figure 2D:
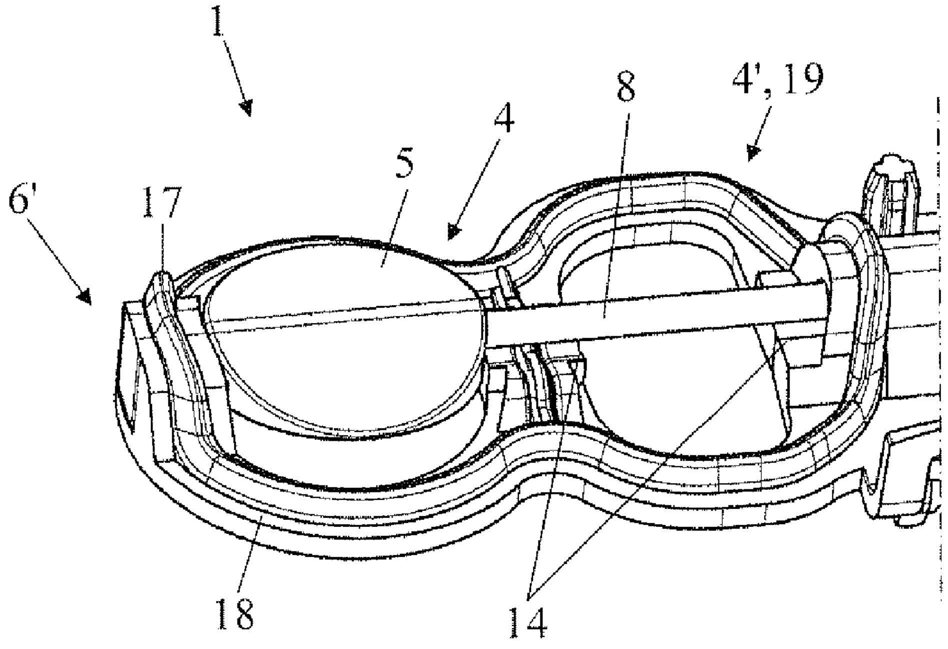
Figure 3A:
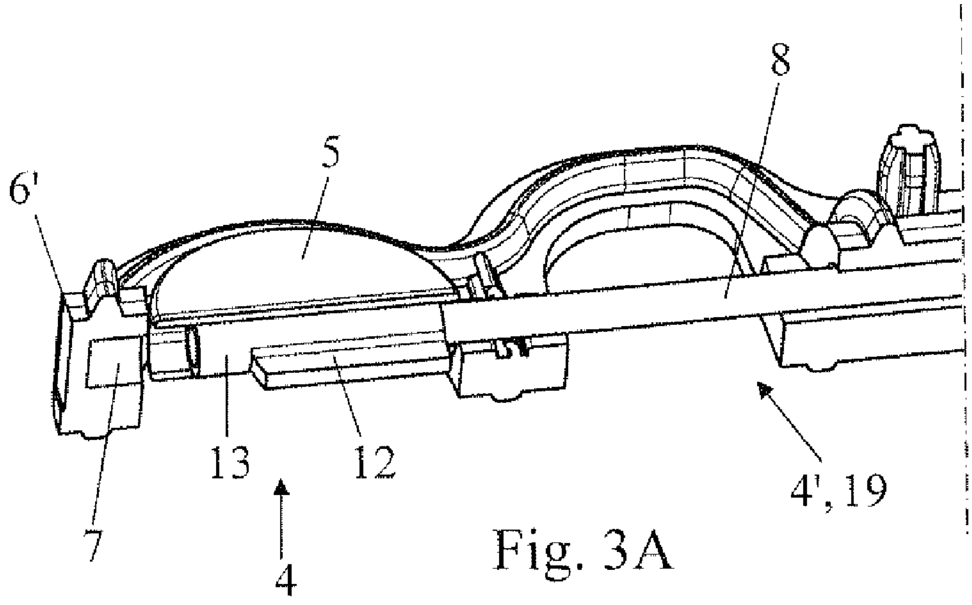
Figure 3B:
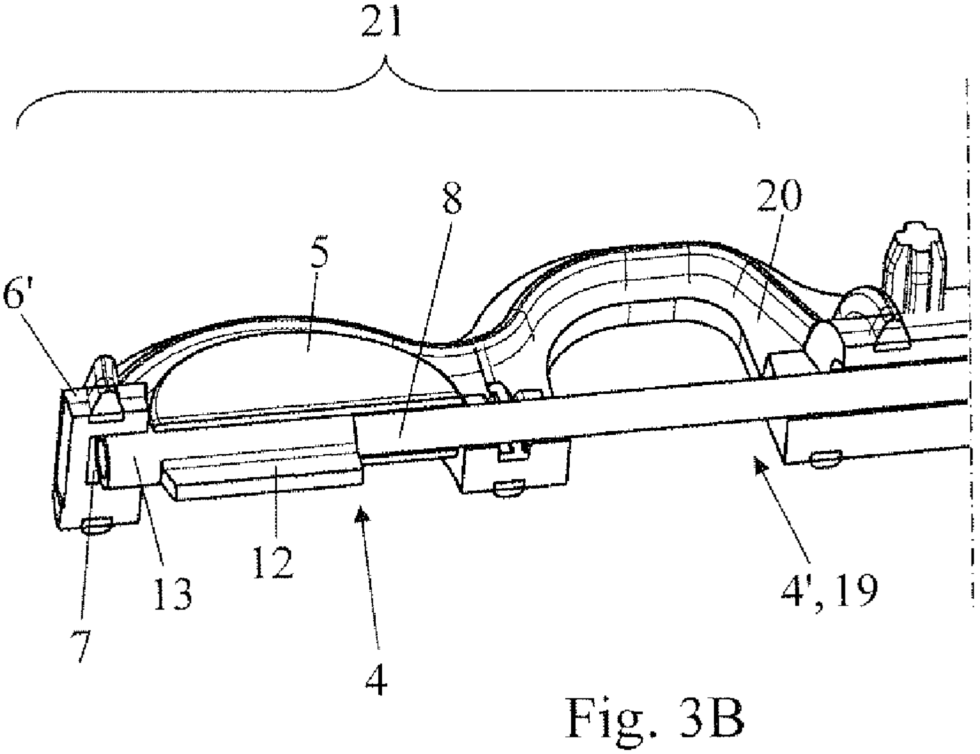
Figure 4A:
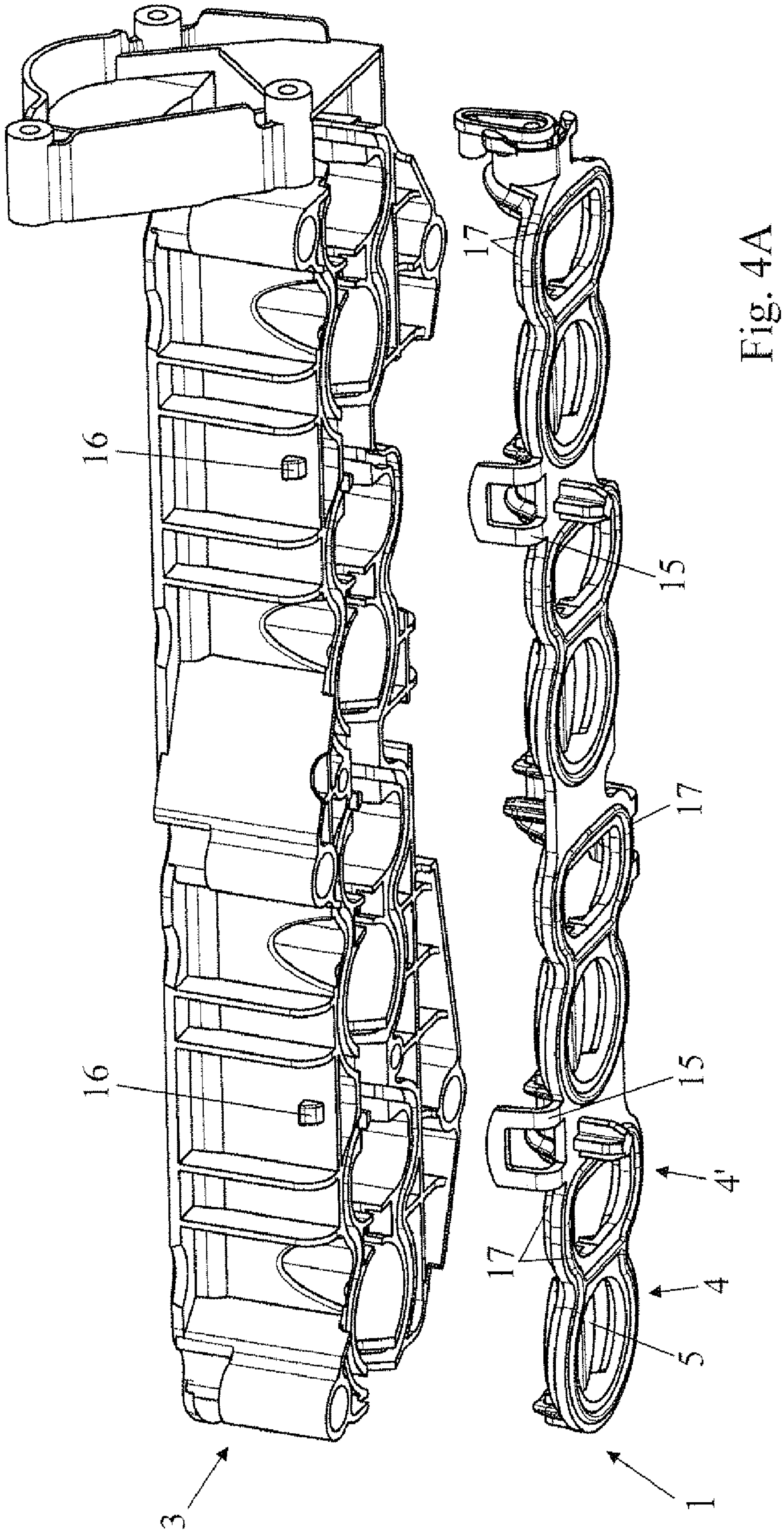
Figure 4B:
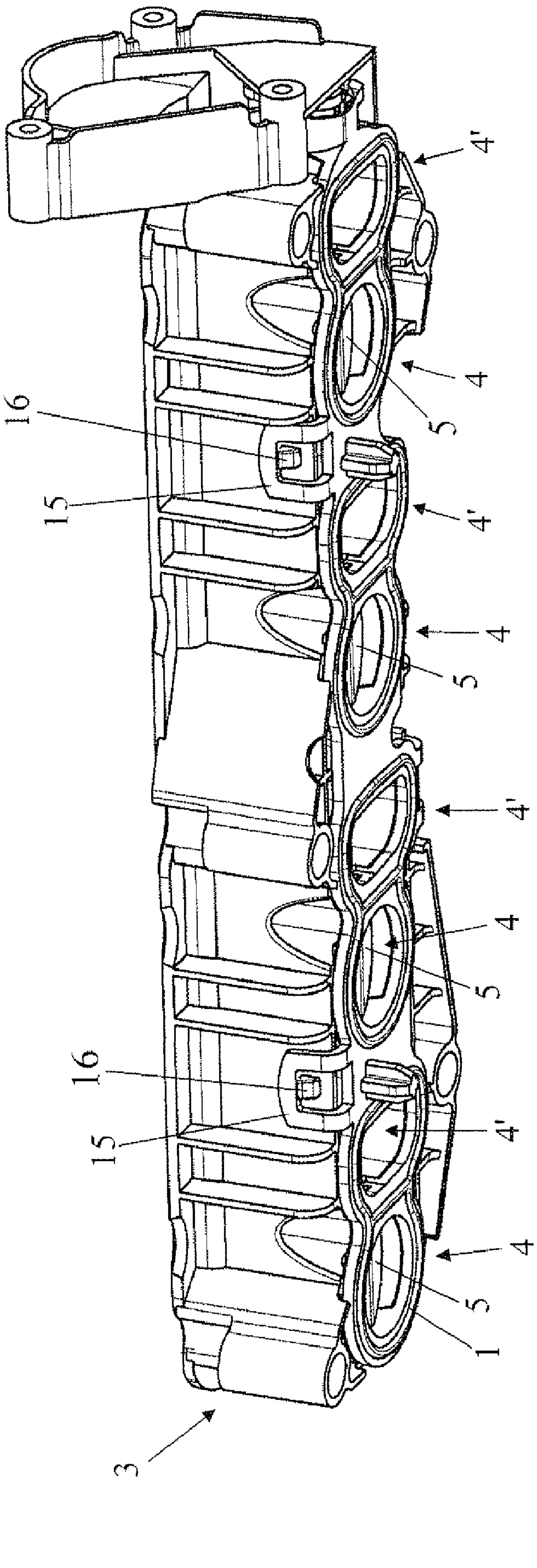
Figure 5A:
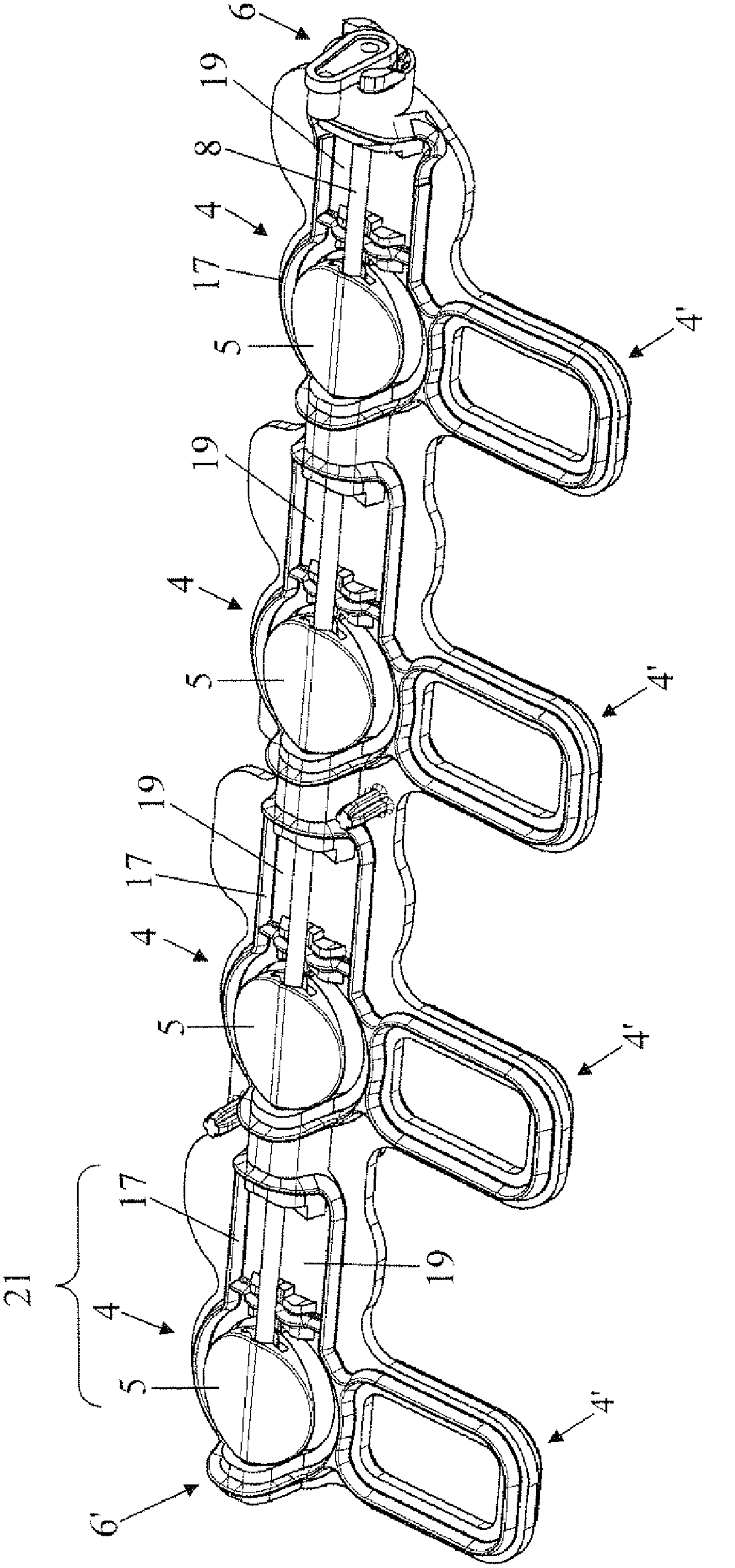
Figure 5B:
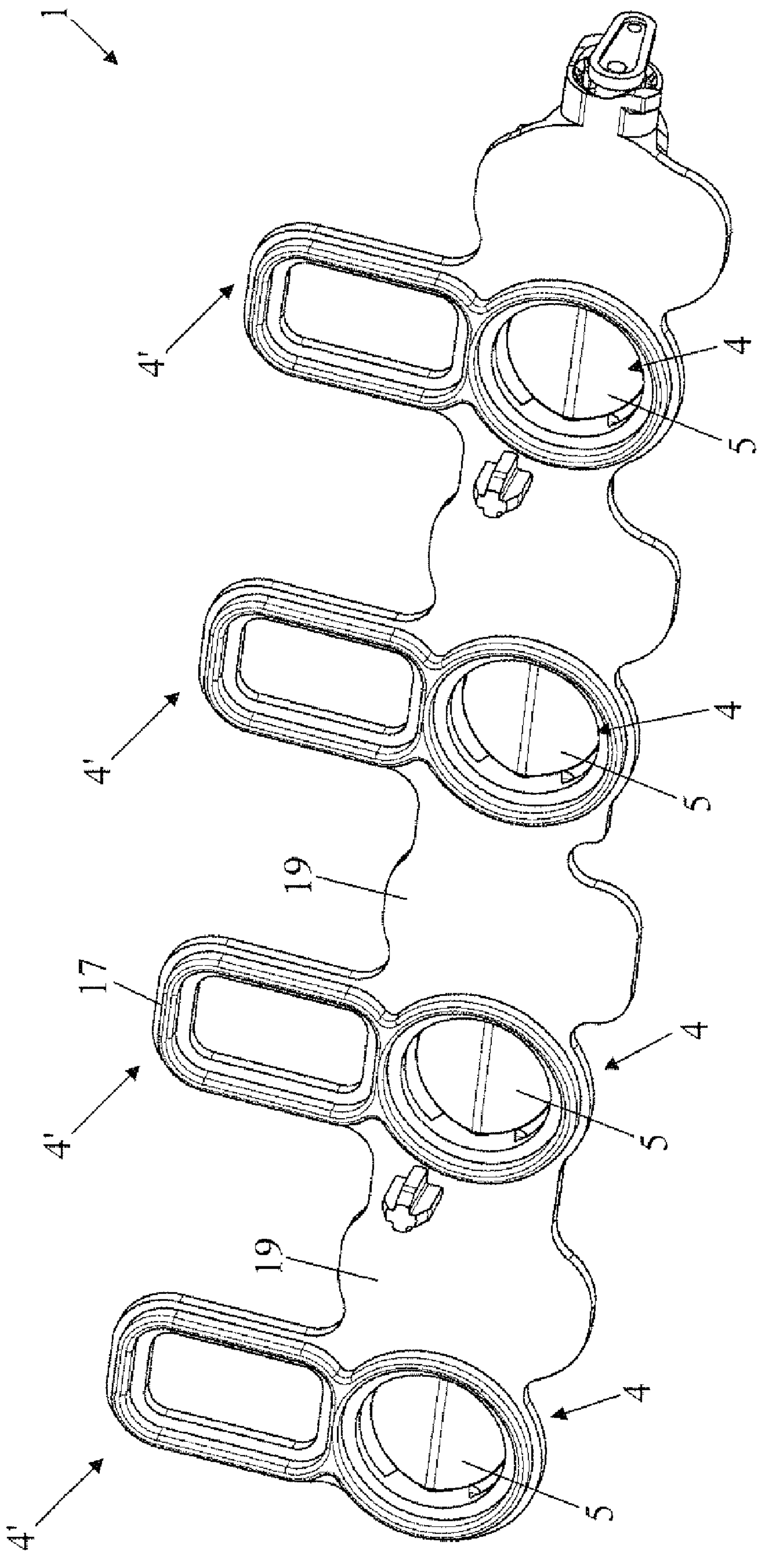
Figure 6A:
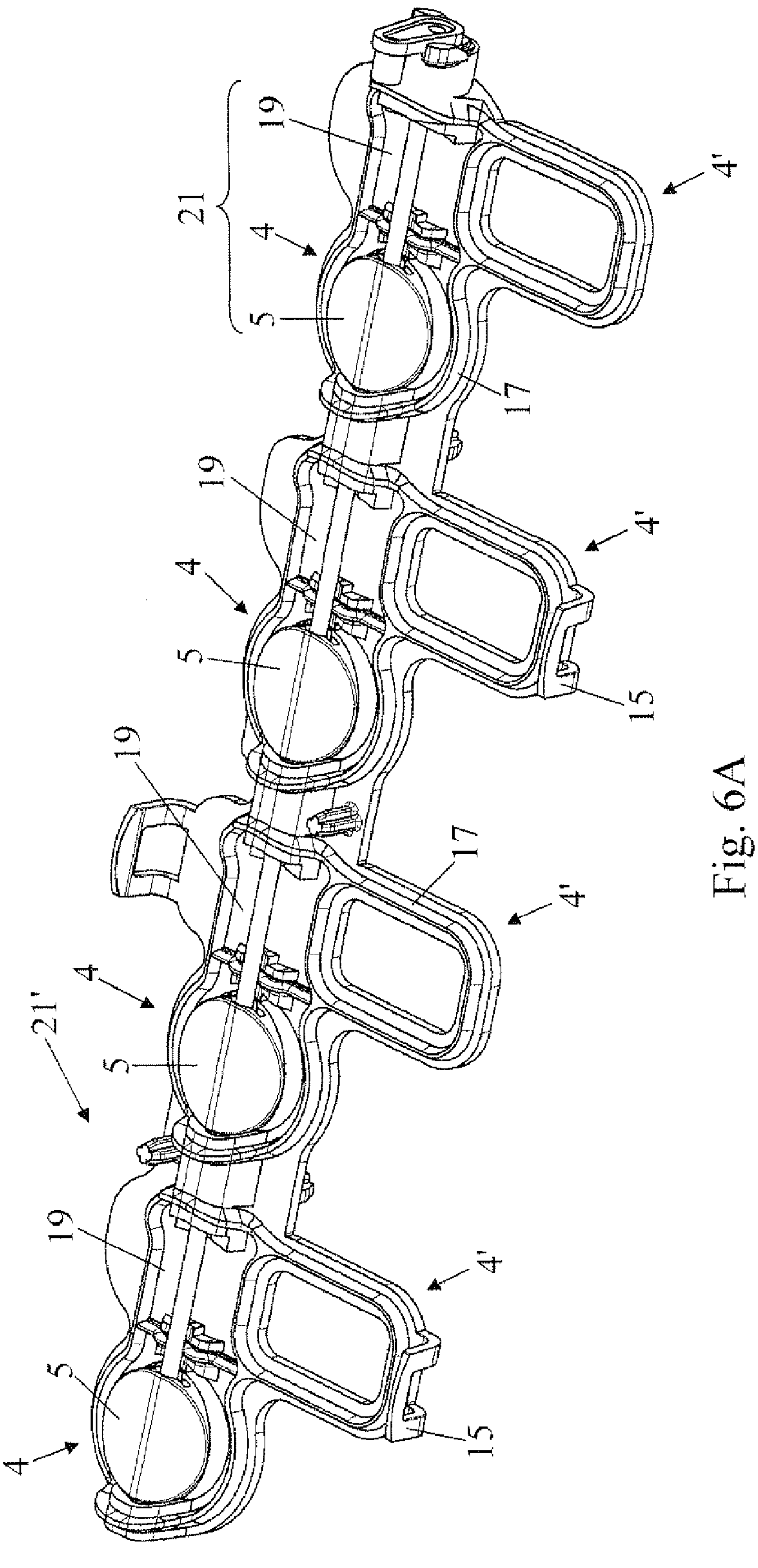
Figure 6B:
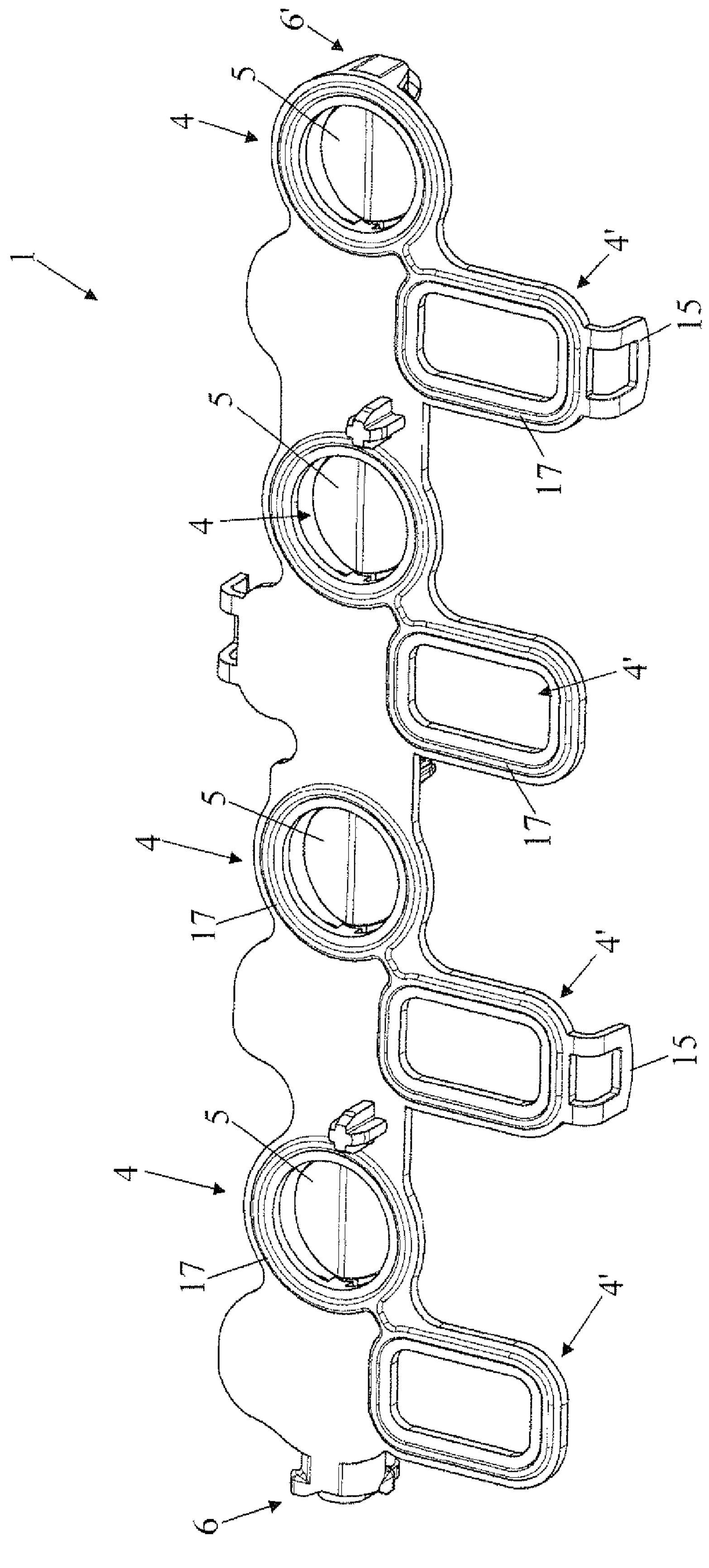

The invention is explained in more detail in the following description, which relates to a preferred embodiment, given by way of a non-restrictive example, and explained with reference to the attached schematic drawings in which:

FIG. 1 is a perspective view of the support plate according to a first embodiment of the invention, FIGS. 2A to 2D are perspective views of part of the support plate shown in FIG. 1 during the different stages of its method of production, FIGS. 3A and 3B are exploded perspective views illustrating the last stages of production of the support plate shown in FIG. 1, FIGS. 4A and 4B show the support plate shown in FIG. 1 before and after its assembly on the end of the pipes of an inlet manifold respectively, FIGS. 5A and 5B show views from above and below respectively of a support plate according to a second embodiment of the invention and FIGS. 6A and 6B show views from above and below respectively of a support plate according to a third embodiment of the invention.

FIGS. 1, 2A to 2D, 3A and 3B illustrate schematically the different stages of the method according to the invention, consisting of producing a support plate 1, according to a first embodiment, for valve bodies 5 with a transverse groove 10 for mounting a control axis 8 and with a generally plane configuration, designed to be mounted between the cylinder head of a thermal engine of a motor vehicle and the distributor or inlet manifold 3, said support plate 1 having an even number of pipe portions 4, 4' designed to connect fluidly the pipes of the inlet manifold 3 to the inlet openings of the cylinder head, each pair of pipe portions 4, 4' comprising a portion of controlled pipe 4 with a valve body 5 and forming a controlled flow passage and another adjacent portion of non-controlled pipe 4' not comprising a valve body 5 and forming a non-controlled flow passage, the controlled portions of pipe 4 being aligned relative to one another and spaced apart from one another.

This method is characterised in that it consists of i) providing a base armature 22 with an almost plane configuration and extending longitudinally which comprises an even number of pipe portions 4, 4' formed within the thickness of said base armature 22, in which the portions of controlled pipes 4 are aligned relative to one another and are each adjacent to two bearings 7, 9 arranged diametrically opposite one another for supporting and guiding the control axis 8 of the valve bodies 5, in which each portion of controlled pipe 4 is connected to a portion 19 of the base armature 22 forming the temporary reception zone of a valve body 5, said portions 19 being aligned with the portions of controlled pipes 4, such that two consecutive portions of controlled pipes 4 are separated from one another by a portion 19 of the base armature 22, and in which each portion 19 comprises a support means 20 for the temporary positioning of a valve body 5, said base armature 22 having at a first end 6 a bearing 7 adjacent to one portion 19 and at the other end 6' a bearing 7 adjacent to a portion of controlled pipe 4, ii) arranging a valve body 5 on the support means 20 on each portion 19 of the base armature 22, such that the assembly of transverse grooves 10 of the valve bodies 5 are aligned relative to one another and with bearings 7 and 9, iii) mounting the control axis 8 in the form of a rod through the bearings 7 and 9 and the transverse groove 10 of each valve body 5 until the insertion end 11 of the said rod is located close to the bearing 7 of the second end 6' of the base armature 22, iv) moulding on each portion of controlled pipe 4 on the control axis 8, on the one hand, a bearing support 12 for a valve body 5 and, on the other hand, a mounting insert 13 for mounting in a corresponding bearing 7, v) mounting each valve body 5 on its corresponding bearing support 12 by sliding each valve body 5 on the control axis 8, from its position at the portion 19 of the base armature 22 towards the adjacent portion of controlled pipe 4, at which the control axis 8 is provided with a bearing support 12, and vi) inserting the mounting inserts 13 in the corresponding bearings 7 by sliding the control axis 8 until it abuts with the bearing 7 situated on the second end 6' of the base armature 22.

The base armature 22 is defined simply as an armature which is designed to form the support plate 1, said armature corresponding to the support plate 1 before the assembly of the control axis 8 of the valve body 5 and possibly the moulding of sealing joints 17.

In a characteristic manner the method can consist of providing a base armature 22 in which the portions of non-controlled pipes 4' are formed in portions 19 of the base armature 22 within the thickness of the latter. This latter embodiment which is shown in FIGS. 1, 2A, 2B, 3A, 3B, 4A and 4B is adapted to configurations in which the pipes of the inlet manifold are aligned. In these conditions the portions of controlled pipe 4 of the support plate 1 are aligned with the portions of non-controlled pipe 4'.

FIG. 2A shows stage ii) which consists of placing in a temporary manner a valve body 5 on a support means 20 on each portion 19 of the base armature 22, such that all of the transverse grooves 10 of the valve bodies 5 are aligned with respect to one another and with the bearings 7 and 9. In the first configuration shown in this figure, each valve body 5 is mounted on a part of the edge delimiting the portion of non-controlled pipe 4' which forms the support means 20 and consists of an element of the internal wall of the portion of non-controlled pipe 4'.

Therefore, and in a characteristic manner, the method according to the invention can consist of providing a base armature 22 in which the portions of controlled pipes 4 and non-controlled pipes 4' are made in one piece with the circumferential wall 2 of the said base armature 22, and in which each portion of non-controlled pipe 4' has on its internal wall, two opposite wall elements 14 formed on the bearings 7, 9 and forming the support means 20 for the temporary positioning of a valve body 5.

Preferably, said wall elements 14 or edges are designed so that they do not hinder the flow of fluid passing through the respective portions of pipe 4' and do not cause a loss of charge. Furthermore, and as shown in particular in FIGS. 2A and 2D, the edges 14 can be in the form of two edges arranged face to face on each portion of pipe 4' and formed on the walls separating the portions of controlled pipes 4 and non-controlled pipe 4'. The shape of these edges 14 as well as their position is selected so as to permit an alignment of the transverse grooves 10 of the valve bodies 5 with the bearings 7 and 9.

In a characteristic manner the method according to the invention may consist of providing a base armature 22 in which the assemblies 21 formed by a portion of controlled pipe 4 and portion 19 or a portion of non-controlled pipe 4' connected to said controlled portion 4 are separated by a separation wall projecting in relation to the plane of the base armature 22, the separation wall in which a bearing 7 is formed in the shape of an opening traversing said separation wall, said bearing forming a guide bearing 7 of the control axis 8.

Furthermore, in each assembly 21 the portion of controlled pipe 4 can be separated from portion 19 or from the non-regulated portion of pipe 4' by a separation wall projecting in relation to the plane of the base armature 22 and forming a support bearing 9 for the control axis 8. Said separation wall projects from the side where the valve bodies 5 are arranged, the support plate 1 being preferably plane relative to the other side which can be mounted on the cylinder head of the engine.

FIG. 2B shows the stage of mounting the control axis 8 which consists of introducing the latter through the assembly of bearings 7, 8 and the transverse grooves 10 of the valve bodies 5. The control axis 8 can be made of steel or brass for example. This insertion is performed from a first end 6 of the base armature 22, which can comprise a guide bearing 7 produced in the form of a hole traversing the circumferential wall 2 of the said base armature 22 at one of its ends 6. The other end 6' of the base armature 22 can also have a guide bearing 7 of the control axis 8 in the form of a non-traversing opening for receiving the insertion end 11 of the control axis 8 on the circumferential wall 2 of the second end 6' of the base armature 22. In the assembly stage iii) the control axis 8 is not positioned in its assembly position, in fact the insertion end 11 of the control axis 8 is not introduced into the aforementioned guide bearing 7 but is held at a distance from the latter, which makes it possible to achieve moulding of the corresponding bearing support 12 and mounting insert 13.

Therefore, FIG. 2C shows the end of the insertion 11 of the control axis 8 after the moulding of the bearing support 12 for the valve body 5 designed to be inserted into the corresponding portion of controlled pipe 4 and the mounting insert 13 designed to be mounted in the guide bearing 7 at the second end 6' of the base armature 22.

This moulding is performed in each portion of rod forming the control axis 8 which is located on a portion of non-controlled pipe 4' or portion 19.

FIG. 3A shows the insertion of a valve body 5 into the portion of pipe 4 it is designed to control. This insertion is performed during stage v) of the method by sliding each valve body 5 onto the control axis 8 from its temporary position to its final position in a controlled portion of pipe 4.

Then it is sufficient to push the control axis 8 up to the insertion of the mounting insert 13 into the corresponding guide bearings 7 to complete the assembly of the support plate 1. This last stage shown in FIGS. 2D and 3A also makes it possible to secure the valve bodies 5 against the corresponding walls.

In this way a support plate 1 is obtained in the form of an element in one piece, the constituent elements of which cannot be taken apart. Advantageously, the guide bearings 7 and the support bearings 9 are situated on the separating walls of the portions of controlled pipes 4 and portions of non-controlled pipes 4' or portions 19 of the base armature 22 and between two rigid surfaces, namely the cylinder head and the inlet manifold 3, such that their alignment is guaranteed over time, as well as the coaxiality of the bearing bodies 5. As the support plate 1 is sandwiched between the cylinder head and the distributor, the deformations of this support plate 1 are limited, as well as the play remaining at the level of the valves. Furthermore, the method according to the invention makes it possible to obtain a support plate 1 with an increased working life.

In the case of a base armature 22 in which the portions of controlled pipes 4 and non-controlled pipes 4' are aligned relative to one another (first embodiment of the invention), the method can consist of performing between stages i) and ii) a stage of moulding sealing joints 17 on the two surfaces of the base armature 22, in corresponding grooves 18 of the said base armature 22 surrounding each assembly formed by a controlled portion of pipe 4 and a non-controlled portion of pipe 4'.

In other embodiments described in the following the method can consist of providing a base armature 22 in which the portions of non-controlled pipe 4' are aligned relative to one another and are formed on the same side of the base armature 22 which projects in relation to the lateral edge of said side and of performing between the stages i) and ii) a stage of moulding sealing joints 17 on the two surfaces of the base armature 22 in the corresponding grooves 18 of the said base armature 22 and surrounding, on the one hand, on the surface comprising the valve bodies 5, each assembly 21' formed by a portion of controlled pipe 4, a portion 19 and a portion of non-controlled pipe 4' and, on the other hand, on the other surface, each assembly 21 formed by a portion of controlled pipe 4 and a portion of non-controlled pipe 4'.

The seal between each assembly 21, 21' and the corresponding openings of the cylinder head as well as the corresponding pipes of the inlet manifold 3 is thus ensured at the time of assembling the support plate 1 between the inlet manifold 3 and the cylinder head by squashing said sealing joints 17. The support plate 1 thus also has a sealing function, in addition to its function of regulating gas flow. It can also absorb vibrations between the distributor and cylinder head and limit the deformations caused by these vibrations.

According to the configuration of the inlet manifold the support plate can have different shapes, particularly with regard to the position of the portions of non-controlled pipes 4' in relation to portions of controlled pipes 4 which are aligned on the base armature 22. Thus in a characteristic manner the method according to the invention can consist of providing a base armature 22 in which the portions of non-controlled pipes 4' are each formed opposite a portion of controlled pipe 4. A support plate 1 formed from such a base armature 22 is shown in FIGS. 5A and 5B.

A third embodiment is shown in FIGS. 6A and 6B and is obtained by providing a base armature 22 in which the portions of non-controlled pipes 4' are each formed opposite a portion 19 of the base armature 22 forming a temporary reception zone for a valve body 5.

As shown in FIG. 2C the method can consist of forming on the control axis 8 bearing supports 12 which comprise two virtually plane flaps extending laterally on either side of the rod forming the control axis 8 and providing valve bodies 5, the transverse groove 10 of which has a shape which is designed to cooperate with the said bearing supports 12. This design of the bearing supports 12 makes it possible to perform a correct movement of the valve bodies 5 by means of the control axis 8. Preferably, the bearing supports 12 have a length which is shorter than the length of the transverse groove 10 of the valve bodies 5, but still longer than half of the length of the latter. This makes it possible to achieve the required guiding of the valves with a minimum of moulded material.

Furthermore, the method may consist of producing each mounting insert 13 by applying an excessive thickening on a portion of the rod forming the control axis 8, said portion having a length that is almost equal to the depth of the corresponding bearing 7 and a diameter such that the mounting insert 13 is able to be housed in the latter.

As shown in FIGS. 2C, 3A and 3B the method can consist of forming each mounting insert 13 in one piece with the corresponding bearing support 12.

An additional subject matter of the invention is a support plate 1 for valve bodies, with a generally plane configuration, produced according to the method according to any one of claims 1 to 12, which is designed to be mounted between the cylinder head of an internal combustion engine and the distributor or inlet manifold 3 and to regulate the gaseous flow passing through the pipes of the inlet manifold 3 in the inlet openings of the cylinder head, said support plate having a virtually plane configuration, at least on its side intended to come into contact with the cylinder head and consisting of at least one pair of portions of controlled pipes 4 comprising a valve body 5 and forming a controlled flow passage and non-controlled portions of pipes 4' which do not comprise a valve body 5 and form a non-controlled flow passage, said portions of controlled pipes 4 and non-controlled pipes 4' connecting in a fluid manner, in the assembled state of the said support plate 1, the pipes of the inlet manifold 3 to the inlet openings of the cylinder head, the valve bodies 5 being controlled by a control axis 8.

Said support plate 1 is characterised in that it comprises

- guide bearings 7 for the control axis 8 aligned relative to one another and produced in the form of openings traversing the separation walls separating each assembly 21 formed by a portion of controlled pipe 4 and a portion 19 of the base armature 22 forming a temporary reception zone for a valve body 5 or a portion of non-controlled pipe 4' associated with said regulated portion 4 and aligned with the assembly of said controlled portions,
- support bearings 9 of the control axis 8 produced by a separation wall separating in each assembly 21 the controlled portion of pipe 4 from portion 19 or from the non-controlled portion of pipe 4' aligned with the assembly of said portions of regulated pipes 4 and projecting in relation to the plane of the base armature 22 and
- sealing joints 17 on the two surfaces of the support plate 1 which ensure the seal of the latter.

Furthermore, with respect to securing it to the inlet manifold 3, the support plate 1 according to the invention can comprise means 15 for securing by elastic deformation on corresponding stubs 16 arranged at the ends of the pipes of the inlet manifold 3. These securing means 15 can be in the form of tabs extending laterally in relation to the longitudinal axis of the support plate 1, as shown in FIG. 1 and cooperating with the corresponding stubs 16 formed on the external walls of the pipes of the inlet manifold 3 (cf. FIGS. 4A and 4B).

Of course, the invention is not restricted to the embodiment described and illustrated in the attached drawings. Modifications remain possible, particularly from the point of view of the constitution of the various elements or by substituting equivalent techniques without departing as such from the scope of protection of the invention.

The invention claimed is:

1. Method for producing a support plate (1) for valve bodies (5) with a transverse groove (10) for mounting a control axis (8) and with a generally plane configuration, designed to be mounted between the cylinder head of a thermal engine of a motor vehicle and the distributor or inlet manifold (3), said support plate (1) having an even number of pipe portions (4, 4') designed to connect fluidly the pipes of the inlet manifold (3) to the inlet openings of the cylinder head, each pair of pipe portions (4, 4') comprising a portion of controlled pipe (4) with a valve body (5) and forming a controlled flow passage and another adjacent portion of non-controlled pipe (4') not comprising a valve body (5) and forming a non-controlled flow passage, the controlled portions of the pipe (4) being aligned relative to one another and spaced apart from one another, the method being characterised in that it consists of i) providing a base armature (22) with an almost plane configuration and extending longitudinally which comprises an even number of pipe portions (4, 4') formed within the thickness of said base armature (22), in which the portions of controlled pipes (4) are aligned relative to one another and are each adjacent to two bearings (7, 9) arranged diametrically opposite one another for supporting and guiding the control axis (8) of the valve bodies (5), in which each portion of controlled pipe (4) is connected to a portion (19) of the base armature (22) forming the temporary reception zone of a valve body (5), said portions (19) being aligned with the portions of controlled pipes (4), such that two consecutive portions of controlled pipes (4) are separated from one another by a portion (19) of the base armature (22), and in which each portion (19) comprises a support means (20) for the temporary positioning of a valve body (5), said base armature (22) having at a first end (6) a bearing (7) adjacent to one portion (19) and at the other end (6') a bearing (7) adjacent to a portion of controlled pipe (4), ii) arranging a valve body (5) on the support means (20) on each portion (19) of the base armature (22), such that the assembly of transverse grooves (10) of the valve bodies (5) are aligned relative to one another and with bearings (7 and 9), iii) mounting the control axis (8) in the form of a rod through the bearings (7 and 9) and the transverse groove (10) of each valve body (5) until the insertion end (11) of the said rod is located close to the bearing (7) of the second end (6') of the base armature (22), iv) molding on each portion of controlled pipe (4) on the control axis (8), on the one hand, a bearing support (12) for a valve body (5) and, on the other hand, a mounting insert (13) for mounting in a corresponding bearing (7), v) mounting each valve body (5) on its corresponding bearing support (12) by sliding each valve body (5) on the control axis (8) from its position at the portion (19) of the base armature (22) towards the adjacent portion of controlled pipe (4) at which the control axis (8) is provided with a bearing support (12), and vi) inserting the mounting inserts (13) in the corresponding bearings (7) by sliding the control axis (8) until it abuts with the bearing (7) situated on the second end (6') of the base armature (22).

2. Method according to claim 1, characterised in that it consists of producing each mounting insert (13) by applying an excessive thickening on a portion of the rod forming the control axis (8), said portion having a length that is almost equal to the depth of the corresponding bearing (7) and a diameter such that the mounting insert (13) is able to be housed in the latter.

3. Support plate for valve bodies, with a generally plane configuration, produced according to the method according to claim 1, which is designed to be mounted between the cylinder head of an internal combustion engine and the distributor or inlet manifold (3) and to regulate the gaseous flow passing through the pipes of the inlet manifold (3) in the inlet openings of the cylinder head, said support plate having a virtually plane configuration, at least on its side intended to come into contact with the cylinder head and consisting of at least one pair of portions of controlled pipes (4) comprising a valve body (5) and forming a controlled flow passage and non-controlled portions of pipes (4'), which do not comprise a valve body (5) and form a non-regulated flow passage, said portions of controlled pipes (4) and non-controlled pipes (4') connecting in a fluid manner, in the assembled state of the said support plate (1), the pipes of the inlet manifold (3) to the inlet openings of the cylinder head, the valve bodies (5) being controlled by a control axis (8), the support plate being characterised in that it has guide bearings (7) for the control axis (8) aligned relative to one another and produced in the form of openings traversing the separation walls separating each assembly (21) formed by a portion of controlled pipe (4) and a portion of non-controlled pipe (4') associated with said regulated portion (4) and aligned with the assembly of said controlled portions, support bearings (9) of the control axis (8) produced by a separation wall separating in each assembly (21) the controlled portion of pipe (4) from the non-controlled portion of pipe (4') aligned with the assembly of said portions of regulated pipes (4) and projecting in relation to the plane of the base armature (22), sealing joints (17) on the two surfaces of the support plate (1) which ensure the seal of the latter and means (15) for securing by elastic deformation on corresponding stubs (16) arranged at the ends of the pipes of the inlet manifold (3).

4. Method according to claim 1, characterised in that it consists of providing a base armature (22) in which the assemblies (21) formed by a portion of controlled pipe (4) and a portion (19) or a portion of non-controlled pipe (4') connected to said controlled portion (4) are separated by a separation wall projecting in relation to the plane of the base armature (22), the separation wall in which a bearing (7) is formed in the shape of an opening traversing said separation wall, said bearing forming a guide bearing (7) of the control axis (8).

5. Method according to claim 4, characterised in that in each assembly (21), the portion of controlled pipe (4) is separated from portion (19) or the portion of non-controlled pipe (4') by a separation wall projecting in relation to the plane of the base armature (22) and forming a support bearing (9) for the control axis (8).

6. Method according to claim 1, characterised in that it consists of forming on the control axis (8) bearing supports (12) which comprise two virtually plane flaps extending laterally on either side of the rod forming the control axis (8), and in that it consists of providing valve bodies (5), the transverse groove (10) of which has shape which is designed to cooperate with said bearing supports (12).

7. Method according to claim 6, characterised in that it consists of forming each mounting insert (13) in one piece with the corresponding bearing support (12).

8. Support plate for valve bodies, with a generally plane configuration, produced according to the method according to claim 1, which is designed to be mounted between the cylinder head of an internal combustion engine and the distributor or inlet manifold (3) and to regulate the gaseous flow passing through the pipes of the inlet manifold (3) in the inlet openings of the cylinder head, said support plate having a virtually plane configuration, at least on its side intended to come into contact with the cylinder head and consisting of at least one pair of portions of controlled pipes (4) comprising a valve body (5) and forming a controlled flow passage and non-controlled portions of pipes (4'), which do not comprise a valve body (5) and form a non-regulated flow passage, said portions of controlled pipes (4) and non-controlled pipes (4') connecting in a fluid manner, in the assembled state of the said support plate (1), the pipes of the inlet manifold (3) to the inlet openings of the cylinder head, the valve bodies (5) being controlled by a control axis (8), the support plate being characterised in that it has guide bearings (7) for the control axis (8) aligned relative to one another and produced in the form of openings traversing the separation walls separating each assembly (21) formed by a portion of controlled pipe (4) and a portion (19) of the base armature (22) forming a temporary reception zone for a valve body (5) associated with said regulated portion (4) and aligned with the assembly of said controlled portions, support bearings (9) of the control axis (8) produced by a separation wall separating in each assembly (21) the controlled portion of pipe (4) from portion (19) aligned with the assembly of said portions of regulated pipes (4) and projecting in relation to the plane of the base armature (22) and sealing joints (17) on the two surfaces of the support plate (1) which ensure the seal of the latter.

9. Support plate according to claim 8, characterised in that it comprises means (15) for securing by elastic deformation on corresponding stubs (16) arranged at the ends of the pipes of the inlet manifold (3).

10. Method according to claim 1, characterised in that it consists of providing a base armature (22) in which the portions of non-controlled pipe (4') are aligned relative to one another and are formed on the same side of the base armature (22), which projects in relation to the lateral edge of said side, and in that it consists of performing between stages i) and ii) a stage of moulding sealing joints (17) on the two surfaces of the base armature (22), in the corresponding grooves (18) of the said base armature (22) and surrounding, on the one hand, on the surface comprising the valve bodies (5), each assembly (21') comprising a portion of controlled pipe (4), a portion (19) and a portion of non-controlled pipe (4') and, on the other hand, on the other surface, each assembly (21) formed by a portion of controlled pipe (4) and a portion of non-controlled pipe (4').

11. Method according to claim 10, characterised in that it consists of providing a base armature (22) in which the portions of non-controlled pipes (4') are each formed opposite a portion of controlled pipe (4).

12. Method according to claim 10, characterised in that it consists of providing a base armature (22) in which the portions of non-controlled pipes (4') are each formed opposite a portion (19) of the base armature (22) forming a temporary reception zone for a valve body (5).

13. Method according to claim 1, characterised in that it consists of providing a base armature (22) in which the portions of non-controlled pipes (4') are formed in portions (19) of the base armature (22) within the thickness of the latter.

14. Method according to claim 13, characterised in that it consists of performing between stages i) and ii) a stage of moulding sealing joints (17) on the two surfaces of the base armature (22), in corresponding grooves (18) of the said base armature (22) surrounding each assembly formed by a controlled portion of pipe (4) and a non-controlled portion of pipe (4').

15. Method according to claim 13, characterised in that it consists of providing a base armature (22) in which the assemblies (21) formed by a portion of controlled pipe (4) and a portion (19) or a portion of non-controlled pipe (4') connected to said controlled portion (4) are separated by a separation wall projecting in relation to the plane of the base armature (22), the separation wall in which a bearing (7) is formed in the shape of an opening traversing said separation wall, said bearing forming a guide bearing (7) of the control axis (8).

16. Method according to claim 13, characterised in that it consists of providing a base armature (22) in which the portions of controlled pipes (4) and non-controlled pipes (4') are produced in one piece with the circumferential wall (2) of said base armature (22), and in which each portion of non-controlled pipe (4') has, on its internal wall, two opposite wall elements (14) formed on the bearings (7, 9) and forming the support means (20) for the temporary positioning of a valve body (5).

17. Method according to claim 16, characterised in that it consists of providing a base armature (22) in which the assemblies (21) formed by a portion of controlled pipe (4) and a portion (19) or a portion of non-controlled pipe (4') connected to said controlled portion (4) are separated by a separation wall projecting in relation to the plane of the base armature (22), the separation wall in which a bearing (7) is formed in the shape of an opening traversing said separation wall, said bearing forming a guide bearing (7) of the control axis (8).

* * * * *